United States Patent [19]

Fujikawa

[11] 4,371,241
[45] Feb. 1, 1983

[54] MOVING PICTURE CAMERA IN WHICH CONSTANT SPEED ZOOMING IS EFFECTED

[75] Inventor: Kenji Fujikawa, Kawasaki, Japan

[73] Assignee: Canon Kabushiki Kaisha, Tokyo, Japan

[21] Appl. No.: 279,946

[22] Filed: Jul. 2, 1981

[30] Foreign Application Priority Data

Jul. 9, 1980 [JP] Japan ................................. 55-93713

[51] Int. Cl.³ .............................................. G03B 3/10
[52] U.S. Cl. ................................................. 352/140
[58] Field of Search ......................... 352/140; 358/227

[56] References Cited

U.S. PATENT DOCUMENTS 3,621,136 11/1971 Stanwood ........................... 358/227
3,972,056 7/1976 Tsujimoto et al. ............. 352/140 X Primary Examiner—Michael L. Gellner
Attorney, Agent, or Firm—Fitzpatrick, Cella, Harper & Scinto

[57] ABSTRACT

This specification discloses a moving picture camera provided with a cam cylinder for transferring movable lens groups, a motor for rotating the cam cylinder, a rotary type resistor having its adjusting shaft coupled to a cam ring through a gear train and to which a constant voltage is applied, a differentiation circuit for differentiating the output voltage of the resistor to detect any variation in rotational speed of the cam cylinder, and an electric circuit for inputting the output signal of the differention circuit to the motor with a zooming speed indication signal, thereby eliminating any speed fluctuation during zooming.

6 Claims, 7 Drawing Figures

MOVING PICTURE CAMERA IN WHICH CONSTANT SPEED ZOOMING IS EFFECTED

BACKGROUND OF THE INVENTION

1. Field of the Invention

This invention relates to a moving picture camera which is capable of zooming photography, and more particularly to a moving picture camera in which the zooming speed set by the operator is maintained.

2. Description of the Prior Art

In keeping with the recent remarkable spread of video cameras in schools, factories, hospitals and homes, high zoom magnifications such as three times, six times and ten times have become required of the phototaking lenses thereof and further, power zooming by electricity has also been expedited in zooming operation.

As a result, these phototaking lenses are becoming functionally approximate to the specification of the zoom lenses mounted on handly cameras heretofore used in radio broadcasting stations for the collection of news data or for the auxiliary photography of dramas or the like while, on the other hand, there are considerably severe requirements as to the cost thereof because they are directed to the use by the general public.

Also, in the requirement for power zoom, not the ON-OFF control as in 8 mm cinecameras but the specification in which zooming speed is continuously variable and the entire zoom area is a maximum of three seconds and a minimum of 30 seconds or 60 seconds comparable to the minimum zoom area for the broadcasting station must unavoidably be realized under limited conditions.

Varying the zooming speed may simply be realized by varying the applied voltage of the motor as shown in FIG. 1A of the accompanying drawings.

However, eliminating the irregularity of zoom torque which provides the load of the motor is practically difficult because it is limited by the manufacturing accuracy of the mechanism for transferring the movable lens for zooming and the smoothness of the control cam, and the torque is also greatly affected by the attitude of the camera when levelled at an object to be photographed.

Accordingly, during slow zooming in particular, irregularity of speed is conspicuous and there occurs an inconvenience that when there is a torque fluctuation in the vicinity of a point P in FIG. 1A, the zooming stops half-way.

In contrast, in the cameras for use in broadcasting stations, the above-noted difficulties are overcome by the use of a motor provided with a tachogenerator, and the characteristic speed-feedback by the tachogenerator and servo amplifier is such that as shown in FIG. 1B of the accompanying drawings, the stable area of speed for torque variation during low speed is wide and theoretically, nearly infinitely low speed drive becomes possible, but it is set to a certain practical range under the influence of the resolution of the tachogenerator and the stability of the circuit.

FIG. 2 of the accompanying drawings shows an example of the conventional drive circuit in which speed feedback is effected by a tachogenerator 5. By a potentiometer and a variable resistor 1 connected to a seesaw type switch for zooming operation, not shown, a direction instruction in telephoto (TELE) direction or wide angle (WIDE) direction and a speed instruction voltage are applied to an amplifier 3, but the voltage is set to zero at the neutral point of the seesaw type switch. A motor 4 operatively associated with a zooming mechanism is rotated by the output of the amplifier 3, and a voltage of the opposite phase generated by the tachogenerator 5 connected to the motor 4 is applied to an adder circuit 2, whereby any irregularity of rotation resulting from torque fluctuation of the load is absorbed to achieve the stabilization of the speed. Designated by Vcc is a constant voltage source.

A problem peculiar to the drive circuit using such a tachogenerator is the expensiveness of the tachogenerator itself and in addition, during low speed, speed fluctuation may result from the resolution of the dipole of the tachogenerator.

SUMMARY OF THE INVENTION

It is an object of the present invention to prevent the zooming speed from varying from a set speed.

It is a second object of the present invention to prevent any speed variation particularly during low speed zooming. It is a third object of the present invention to provide an inexpensive speed control circuit.

The invention will become fully apparent from the following detailed description thereof taken in conjunction with the accompanying drawings.

BRIEF DESCRIPTION OF THE DRAWING

FIGS. 5A and 5B show the motor voltage waveforms.

DESCRIPTION OF THE PREFERRED EMBODIMENTS

Figure 1:
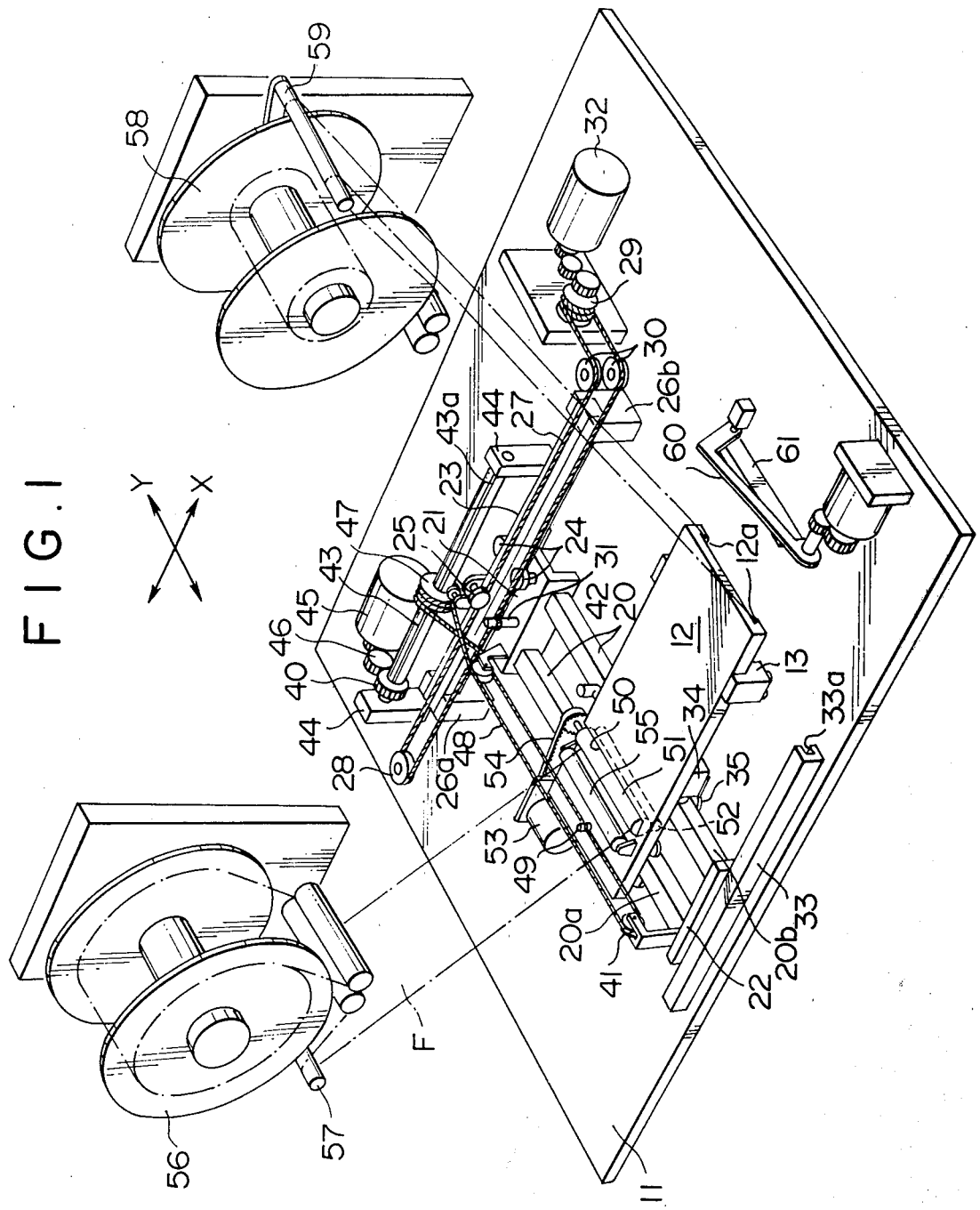
FIGS. 1A and 1B are voltage torque graphs.
Figure 2:
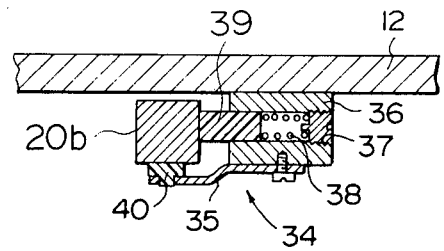
FIG. 2 is a diagram of the conventional electric circuit.
Figure 3:
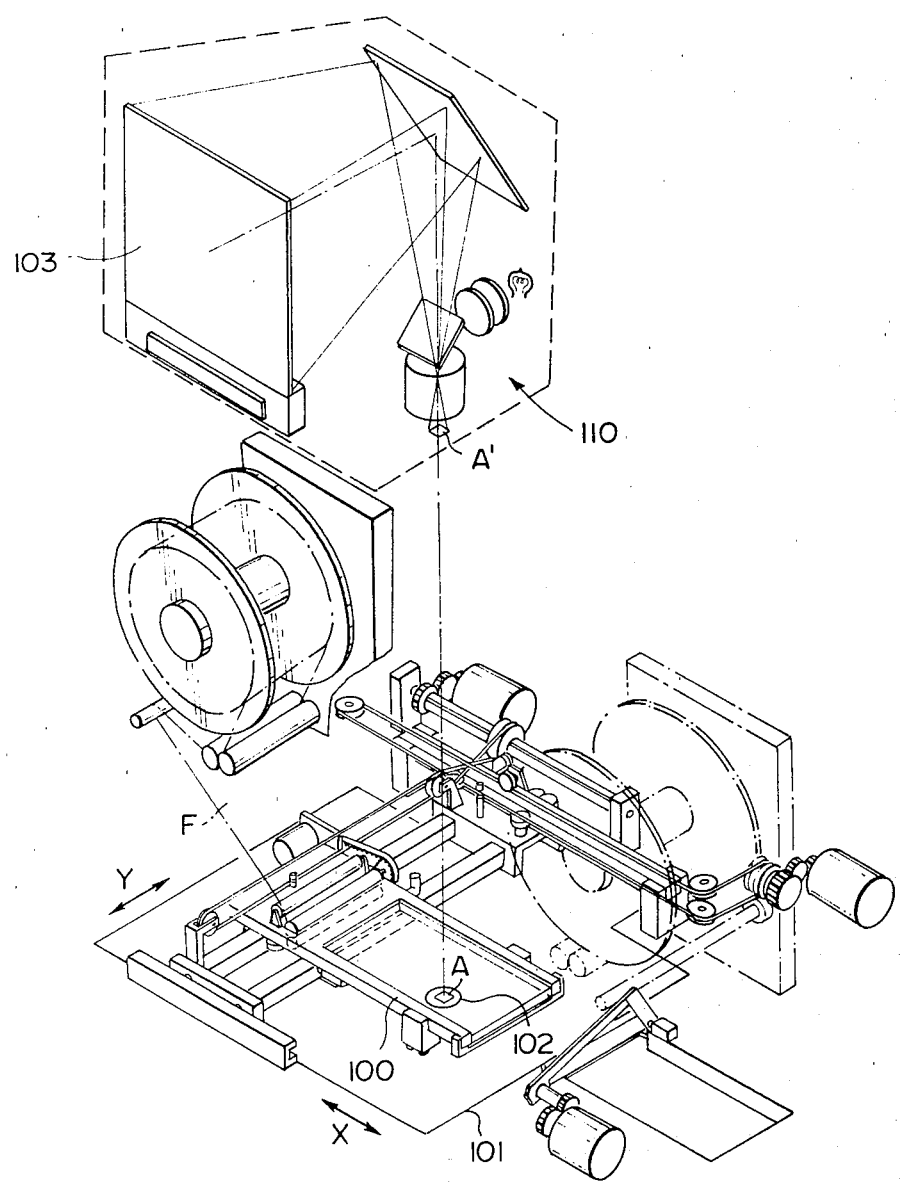
FIG. 3 diagrammatically shows an assembly of a specific example of the machine and an electric circuit.
Figure 1A:
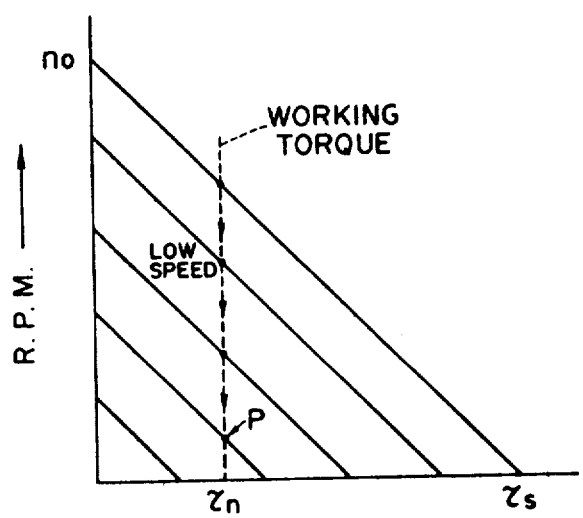
Figure 1B:
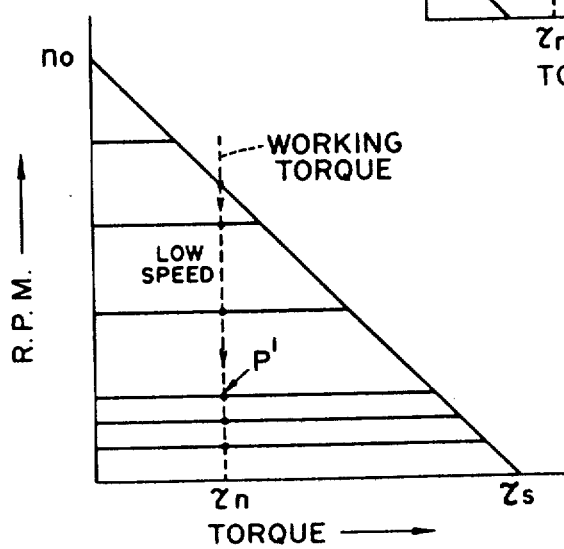
Figure 2:
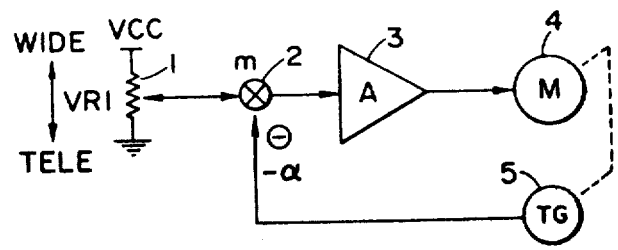

Referring to FIG. 3 which illustrates an embodiment of the present invention, a variable resistor 1, an adder circuit 2, an amplifier 3 and a motor 4 connected to a seesaw type switch are similar to those shown in FIG. 2.

A focusing lens 10, a variator (variable focal length lens) 11, a compensator (image plane movement compensating lens) 12 and a relay lens 13 together constitute a zoom lens. Designated by 14 is a photographing tube. Reference numeral 15 designates a zooming control cam cylinder. Movement of the variator 11 and compensator 12 may be controlled by a cam groove formed in the cam cylinder. A gear 16 is fixed to the cam cylinder 15 and is in mesh engagement with a pinion 17 coupled to the motor 4, so that when the motor 4 is rotated, the cam cylinder 15 is rotated, whereby zooming between TELE-WIDE is achieved. Another pinion 18 is fixed to the resistance adjusting shaft (not shown) of a rotary type variable resistor 19, and the adjusting shaft causes a wiper 19a to slide from one end to the other end of a resistor 19b. A constant voltage Vcc is applied to the resistor 19b and therefore, the voltage is continuously varied with movement of the wiper 19a and, if the rotational speed of the adjusting shaft is constant, the voltage will be smoothly varied at a predetermined proportion. That is, since the pinion 18 is in mesh engagement with the gear 16, the output of the variable resistor 19 has a predetermined relation with the revolution of the motor 4 or the angle of rotation of the cam cylinder 15. A differentiation circuit 20 comprises a capacitor $C_1$ and resistor $R_1$, and has the function of differentiating the output of the variable resistor 19 and applies it to the adder circuit 2 of the amplifier 3 in the opposite phase. Potentio $VR_2$ is proportional to an angle $\theta$ and therefore, the result obtained by differentiating this becomes an angular speed $d\theta/dt=\omega$ and performs the same function as a tachogenerator. It is to be noted that the angle may sometimes be substituted for by a length of straight line.

In the above-described construction, when the variable resistor 1 is adjusted and the motor 4 is driven through the amplifier 3, the cam cylinder 15 is rotated by way of the gears 17 and 16 to transfer the variator 11 and the compensator 12, thus accomplishing zooming. If, at that time, the torque fluctuates and for example, more than ordinary torque is applied, there will occur a phenomenon that zooming speed is decreased, but in the present embodiment, the variable resistor 19 and the differentiation circuit 20 catch such fluctuation through the gears 16 and 18. That is, when the zooming direction and zooming speed toward WIDE or TELE are set by zooming operation, the motor 4 rotates in the set direction at a set speed and the pinion 18 is also rotated through the intermediary of the gear train 17, 16. Accordingly, the wiper 19a slides on the resistor 19b at a speed matching the zooming speed and therefore, the voltage taken out from the wiper 19a increases or decreases at a predetermined proportion. However, if the resistance to which the cam cylinder is subjected when it is rotated is varied, the rotational speed of the pinion 18 will be varied and the output voltage will be varied. The differentiation circuit 20 detects such variation in the voltage and applies an acceleration signal to the adder circuit 2, so that the number of revolutions of the motor 4 is increased and actually maintained at a predetermined speed.

Figure 4A:
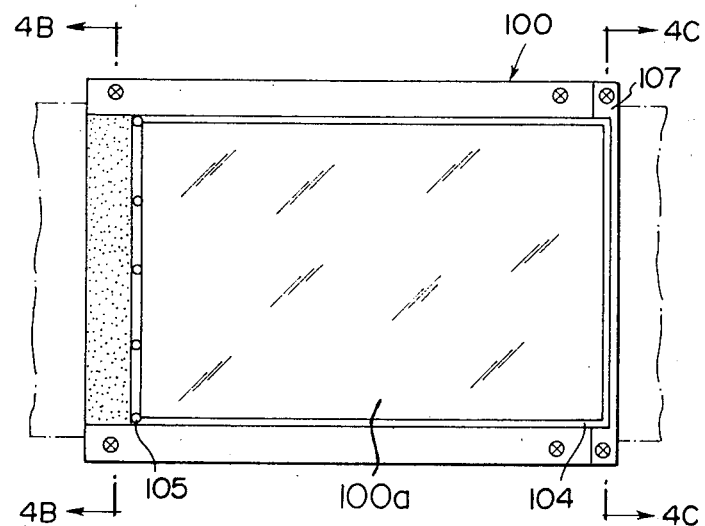
FIG. 4 is a diagram of a specific example of the electric circuit.
Figure 4B:
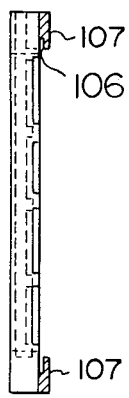
Figure 4C:
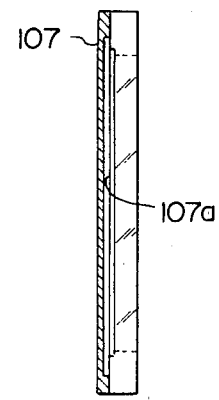

FIG. 4 shows a more specific circuit example. In FIG. 4, a variable resistor 1 and a motor 4 are similar to those described previously, and reference numeral 19' designates a rotary type variable resistor which obtains a negative feedback with the TELE-WIDE direction being in the opposite phase with respect to the variable resistor 1. $C_1$ denotes a non-polar capacitor for differentiation, and $R_1$ designates a fixed resistor for differentiation. A point m is a wired adder circuit, and amplifiers 21a and 21b are $(A/2+A/2)$ and together constitute an amplifier A.

$R_3$ and $R_4$ designate resistors for setting the neutral point potential of the variable resistor 1, $R_5$, $R_6$ and $R_7$ denote resistors for setting the gain of the amplifier, and $C_2$ and $C_3$ designate oscillation preventing capacitors.

Since the load impedance (in this case, the impedance of the adder circuit) is finite, it may be considered that the negative feedback voltage $-\alpha$ is proportional to the applied voltage Vcc of the variable resistor 19' and the capacitor $C_1$ and is in inverse proportion to the fixed resistor $R_1$ and the neutral point impedance Z.

Also, synthetically, the optimum area is determined by the equilibrium of the gain of the amplifier and the stability of the system and as an example, the capacitor $C_1$ is selected to the value of 1 $\mu$F-4.7 $\mu$F. Why the capacitor $C_1$ has been made non-polar is that + and − symmetrical differentiated waveforms are required. Also, if there is provided an amplifier for the exclusive use for $-\alpha$, the time constant of the capacitor $C_1$ and resistor $R_1$ can be made small, but the number of parts of the circuit and the increase in reactive consumed current must be taken into account. When the main switch is closed, there is seen a phenomenon that a charging current flows to the differentiation capacitor $C_1$ to momentarily energize the motor, whereas this forms no problem in use and therefore, in almost all cases, the addition of a circuit for preventing such phenomenon at the initial stage is unnecessary.

If zooming operation is effected by the described circuit, a current having such a voltage waveform as shown in FIG. 5A, for example, flows to the motor 4, but such fluctuation of the voltage has been produced as the result of the feedback for negating the torque fluctuation of the zooming mechanism and after all, constant speed control becomes possible. If the speed feedback is not effected and a constant voltage as shown in FIG. 5B is supplied to the motor 4, the zooming speed will fluctuate with the variation in torque. The present invention is also applicable to other than the control of zooming.

The present invention hitherto described can be constituted by inexpensive electrical elements and this leads to a greatly reduced cost as compared with the tachogenerator can not only achieve an effect equivalent to that of the tachogenerator but can also eliminate any fluctuation which may occur in the tachogenerator in dependence of the resolution when the speed is very slow.

What I claim is:

1. A moving picture camera provided with:
objective optical means having a plurality of movable groups;
control means for controlling the movement of said groups for zooming;
an electrical device for driving said control means;
converter means coupled to said electric device for converting the displacement of said control means into a voltage variation; and
a differentiation circuit for differentiating said voltage variation and inputting the result to said electric device.

2. A moving picture camera according to claim 1, wherein said converter means is a rotary type resistor to which a predetermined voltage is applied and which has an adjustment shaft.

3. A moving picture camera according to claim 1, wherein said control means has a cam engaged by said movable groups.

4. A moving picture camera according to claim 1, further provided with setting means for setting the rotational speed of said electric device, an adder circuit for summing the first output signal of said differentiation circuit and the second output signal of said setting means, and an amplifier circuit for amplifying the third output signal of said adder circuit and inputting the amplified signal to said electric device.

5. A moving picture camera according to claim 4, wherein said adder circuit comprises lead wires connected together.

6. A moving picture camera according to claim 4, wherein said amplifier circuit has two symmetrically disposed amplifiers.

* * * * *

UNITED STATES PATENT AND TRADEMARK OFFICE
CERTIFICATE OF CORRECTION

PATENT NO. : 4,371,241

DATED : February 1, 1983

INVENTOR(S) : Kenji Fujikawa

It is certified that error appears in the above-identified patent and that said Letters Patent is hereby corrected as shown below:

The title page should be deleted to appear as per attached title page.

The sheets of drawings should be deleted to appear as per attached sheets.

Signed and Sealed this

Twenty-fifth Day of October 1983

[SEAL]

Attest:

Attesting Officer

GERALD J. MOSSINGHOFF

Commissioner of Patents and Trademarks

United States Patent [19]
Fujikawa

[11] 4,371,241
[45] Feb. 1, 1983

[54] MOVING PICTURE CAMERA IN WHICH CONSTANT SPEED ZOOMING IS EFFECTED

[75] Inventor: Kenji Fujikawa, Kawasaki, Japan

[73] Assignee: Canon Kabushiki Kaisha, Tokyo, Japan

[21] Appl. No.: 279,946

[22] Filed: Jul. 2, 1981

[30] Foreign Application Priority Data

Jul. 9, 1980 [JP] Japan ................... 55-93713

[51] Int. Cl.³ .............................................. G03B 3/10
[52] U.S. Cl. ................................................. 352/140
[58] Field of Search ....................... 352/140; 358/227

[56] References Cited

U.S. PATENT DOCUMENTS 3,621,136 11/1971 Stanwood ................... 358/227
3,972,056 7/1976 Tsujimoto et al. .............. 352/140 X Primary Examiner—Michael L. Gellner
Attorney, Agent, or Firm—Fitzpatrick, Cella, Harper & Scinto

[57] ABSTRACT

This specification discloses a moving picture camera provided with a cam cylinder for transferring movable lens groups, a motor for rotating the cam cylinder, a rotary type resistor having its adjusting shaft coupled to a cam ring through a gear train and to which a constant voltage is applied, a differentiation circuit for differentiating the output voltage of the resistor to detect any variation in rotational speed of the cam cylinder, and an electric circuit for inputting the output signal of the difference circuit to the motor with a zooming speed indication signal, thereby eliminating any speed fluctuation during zooming.

6 Claims, 7 Drawing Figures

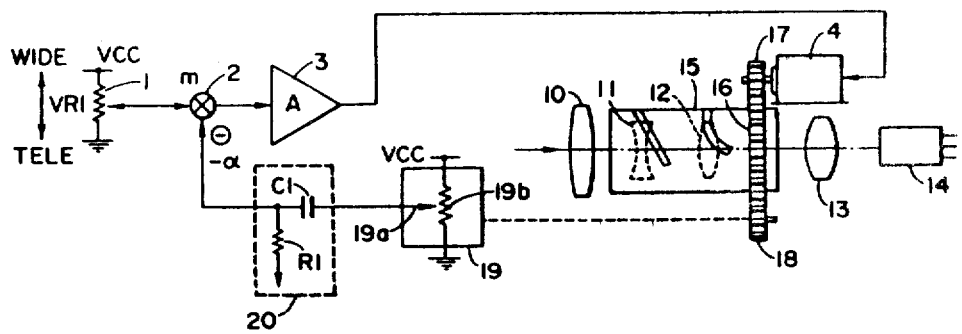

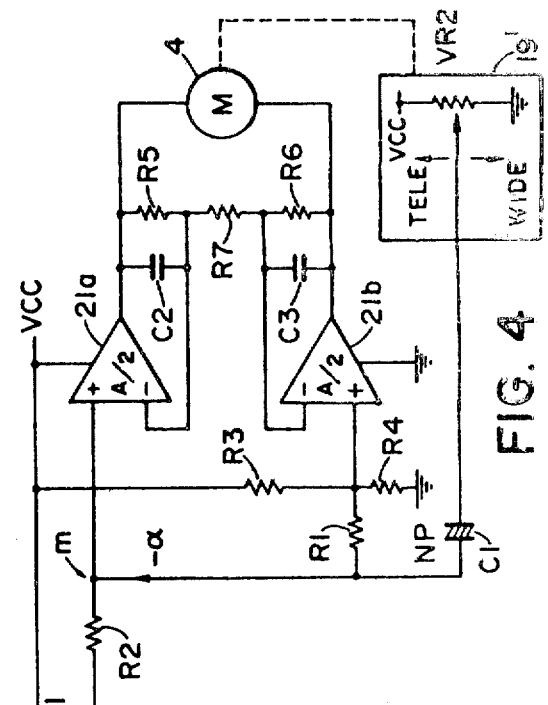
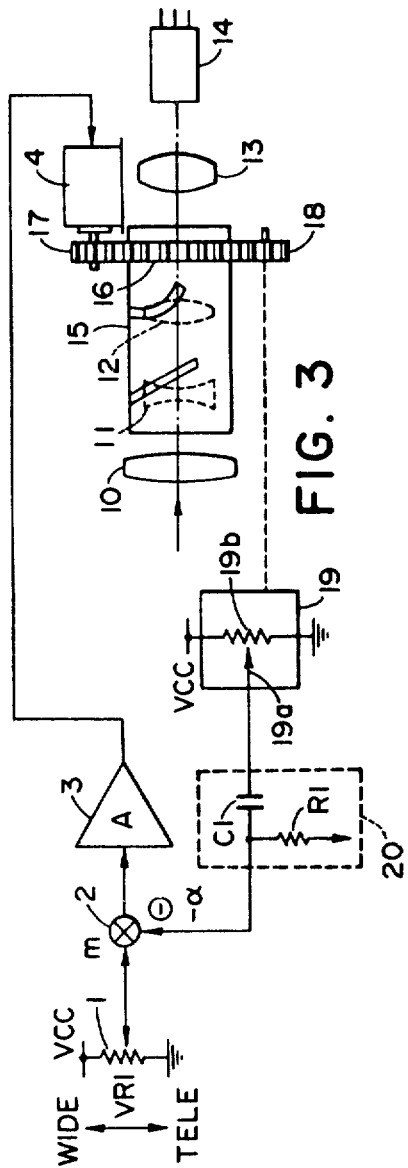
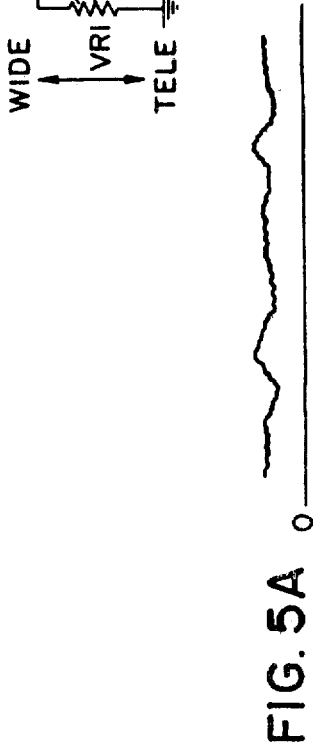
FIG. 3
FIG. 4
FIG. 5A
FIG. 5B

UNITED STATES PATENT AND TRADEMARK OFFICE
CERTIFICATE OF CORRECTION

PATENT NO. : 4,371,241
DATED : February 1, 1983
INVENTOR(S) : KENJI FUJIKAWA

It is certified that error appears in the above-identified patent and that said Letters Patent is hereby corrected as shown below:

Col. 1, line 21, change "handly" to --hand--.

Col. 3, line 5, change "Potentio" to --Potential--.

Claim 1, line 1, change "provided with" to --comprising--.

Claim 3, line 2, change "by said" to --by each of said--.

Claim 4, line 2, change "provided with" to --comprising--;

line 4, change "the" to --a--;

line 5, change "the" to --a--;

line 6, change "the" to --a--.

Signed and Sealed this

Twenty-fifth Day of December 1984

[SEAL]

Attest:

GERALD J. MOSSINGHOFF

*Attesting Officer*     *Commissioner of Patents and Trademarks*